United States Patent [19]
Eddy, Jr.

[11] Patent Number: 4,682,675
[45] Date of Patent: Jul. 28, 1987

[54] VARIABLE RATE SHOCK ABSORBER

[75] Inventor: William C. Eddy, Jr., West Bloomfield, Mich.

[73] Assignee: Allied Corporation, Morristown, N.J.

[21] Appl. No.: 801,657

[22] Filed: Nov. 25, 1985

[51] Int. Cl.$^4$ .............................................. F16F 9/46
[52] U.S. Cl. ................................ 188/299; 188/285; 280/707
[58] Field of Search ............. 188/279, 285, 299, 315; 280/707

[56] References Cited

U.S. PATENT DOCUMENTS

| | | | |
|---|---|---|---|
| 2,844,028 | 8/1958 | Gunther | 188/299 X |
| 3,039,566 | 6/1962 | Rumsey | 188/299 |
| 3,603,612 | 9/1971 | Hill et al. | 188/299 X |
| 4,031,989 | 6/1977 | Blazquez | 188/299 |
| 4,600,215 | 7/1986 | Kuroki et al. | 188/299 X |

FOREIGN PATENT DOCUMENTS 2911768 10/1980 Fed. Rep. of Germany ...... 188/299

*Primary Examiner*—Duane A. Reger
*Attorney, Agent, or Firm*—Markell Seitzman; Russel C. Wells

[57] ABSTRACT

A variable rate shock absorber having the interior of a working cylinder divided by a piston into an upper and lower working chamber. The lower working chamber is connected to a reservoir by a bi-directional valve member. A solenoid valve housed in a hollow piston rod has an actuated state connecting the upper working chamber to the reservoir. The output of the solenoid valve is connected to the reservoir by means of an axially disposed telescoping cylinder passing through the piston and the bi-directional valve member.

15 Claims, 4 Drawing Figures

VARIABLE RATE SHOCK ABSORBER

FIELD OF THE INVENTION

The invention is related to the field of hydraulic dampers or shock absorbers and in particular to an electrically controlled variable rate shock absorber.

PRIOR ART

To meet the requirements of varying road conditions and different driving modes it has always been desirable to be able to change the rate or stiffness of a vehicles hydraulic dampers commonly referred to as shock absorbers. Various types of electrically controlled shock absorbers are known in the art. Skwaryk in U.S. Pat. No. 2,507,276 teaches hydraulic damper using a solenoid actuated valve to increase its stiffness in response to the application of the vehicle's brakes to prevent the front end of the vehicle from dipping downwardly during sudden stops. R. D. Rumsey in U.S. Pat. No. 3,039,566 discloses a hydraulic shock absorber in which a solenoid actuated valve simultaneously vents the upper and lower working chambers to the reservoir while Ashiba in U.S. Pat. No. 4,463,839 discloses a hydraulic damper (shock absorber) in which a solenoid actuated rotary valve is operative to open and close piston by-pass passages connecting the upper and lower working chambers.

SUMMARY OF THE INVENTION

The invention is a variable rate shock absorber of the type having an enclosed working cylinder, an external housing circumscribing said working cylinder and one end thereof to form a fluid reservoir therebetween, a piston member dividing the interior of said working cylinder into an upper working chamber and a lower working chamber, and a hollow strut slidably received in the working cylinder having one end connected to the piston and the opposite end extending external to the working cylinder. The shock absorber characterized by a telescoping cylinder axially disposed in said working cylinder having one end in fluid communication with the reservoir and the other end slidably received into the interior of the hollow strut through the piston and solenoid valve means disposed in the hollow strut and connected to said other end of said telescoping cylinder, said solenoid valve means having an inlet port in fluid communication with said upper working chamber and an outlet port in fluid communication with the reservoir through said telescoping cylinder.

One advantage of the variable rate shock absorber is that it only requires a single solenoid valve to change the stiffness in both contraction and extension. Another advantage is that the fluid flow through the solenoid valve is in a single direction permitting the use of a fast acting poppet type valve which permits the stiffness of the shock absorber to be changed during the compression or extension stroke. These and other advantages of the variable rate shock absorber will become more apparent from a reading of the specifiction in conjunction with the drawings.

DETAILED DESCRIPTION OF THE INVENTION

Figure 1:
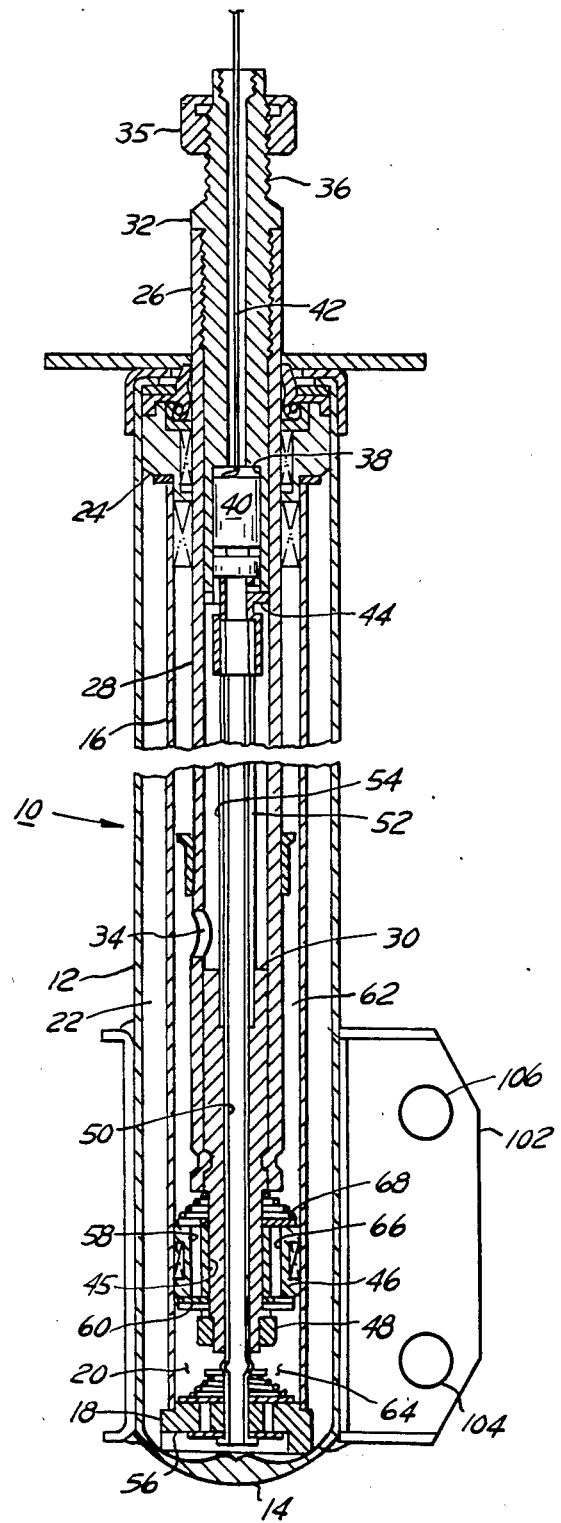
FIG. 1 is a cross-sectional side view of the variable rate shock absorber.
Figure 2:
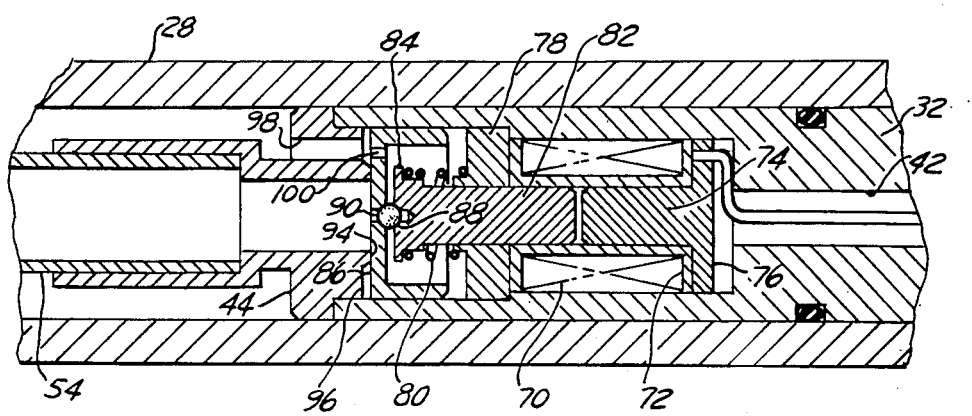
FIG. 2 is an enlarged cross-sectional side view showing the details of the solenoid valve.

The details of the single solenoid variable rate shock absorber are shown on FIGS. 1 and 2. Refering first to FIG. 1, the shock absorber 10 comprises a cylindrical outer shell or housing 12 having an enclosed end 14. Disposed in the housing 12 is an inner cylinder 16 having the end adjacent to the enclosed end 14 enclosed by a two way pressure relief valve member 18. The relief valve member 18 connects the interior 20 of inner cylinder 16 with the cylindrical reservoir 22 defined by the volume between the housing 12 and the inner cylinder 16. The opposite end of inner cylinder 16 is connected to an annular end plate 24. Annular end plate 24 seals the end of the reservoir 22 at the end opposite enclosed end 14. The internal diameter of annular end plate 24 functions as a bearing surface of a piston rod assembly 26. The piston rod assembly 26 comprises a hollow cylindrical strut 28 having its internal end enclosed by a piston mounting stud 30 and its external end enclosed by a mounting stud 32. At least one aperture, such as aperture 34 is provided through the wall of cylindrical strut 28 adjacent to said piston mounting stud to provide a fluid connection between the internal volume of inner cylinder 16 and the internal volume of the cylindrical strut 26.

The mounting stud 32 has provisions for mounting the piston rod assembly 26 to the vehicle. This may be a mounting ring as is known in the art or a threaded portion 36 for receiving a locking nut 35 as shown in FIG. 1. The mounting stud 32 has a cylindrical cavity 38 provided at its internal end to house a solenoid valve 40 and an axial bore 42 proving a conduit for the solenoid valve's electrical leads. The details of the solenoid valve 40 are shown in greater detail in FIG. 2 and will be described hereinafter. A valve seat member 44 is connected to the internal end of mounting stud 32.

The piston stud 30 has a land 45 receiving thereon a piston assembly 46. The piston assembly 46 is secured to the piston stud 30 by a nut 48 threaded onto the end thereof as shown. The piston stud 30 has an axial aperture passing therethrough for slidably receiving a first cylinder section 50 of a telescoping cylinder assembly 52. The first section 50 of the telescoping cylindrical assembly 52 is connected at one end to the relief valve member 18 and passes therethrough. A fluid passageway 56 provided at the base of the relief valve member 18 connects the interior of the telescoping cylinder assembly 52 with the reservoir 22. A second section 54 of the telescoping cylinder assembly 52 circumscribes and slidably receives the first section 50. One end of second section 54 is connected to the piston stud and the other end is connected to valve seat member 44.

The piston 46 is of a conventional design of the type having a first set of longitudinal passageways passing therethrough, such as passageway 58. Passageway 58 is open at one end and occluded at the opposite end by a first spring loaded flapper valve 60 to provide a undirectional fluid flow past the piston from an upper working chamber 62 on one side of the piston 46 to a lower working chamber 64 on the other side of piston 46. The piston 46 also has a second set of longitudinal passageways, illustrated by longitudinal passageway 66 which is open at the end facing lower working chamber 64 and is occluded at the other end by a second spring loaded flapper valve 68 to provide a unidirectional fluid flow through piston 46 from the lower working chamber 64 to the upper working chamber 62. As is known, the diameters of longitudinal passageways 58 and 66 and the spring loading on the flapper valves 60 and 68 will determine the compression and rebound rates of the shock absorber 10.

Referring now to FIG. 2, there is shown the details of the solenoid valve 40. As shown, solenoid valve 40 has a solenoid coil 70 wound on a bobbin 72 circumscribing a stator 74. The stator 74 has a radial flange 76 retaining one end of the bobbin 72. An annular flux plate 78 is biased against the other end of bobbin 72 by a spring 80 circumscribing an armature 82. The other end of the spring 80 engages a radial flange 84 provided at the end of armature 82 biasing the armature towards a poppet 86. A ball 88 is attached to the armature 82 concentric with an axial aperture 90 provided through the poppet 86. The spring 80 biases the ball 88 against poppet 86 closing axial aperture or spill port 90 and further biases the poppet against the valve seat 94 of valve seat member 44. The valve seat member 44 has an annular recess 96 circumscribing valve seat 94. A port 98 connects the annular recess 96 with the interior of cylindrical strut 28 which is connected to working chamber 62 through aperture 34 provided through the wall of the cylindrical strut 28. A bleed port 100 connects annular recess 96 to the other side of the poppet 96. The diameter of the bleed portion 100 is smaller than the diameter of the drain port 90.

In its normal use the shock absorber 10 is mounted vertically, with the piston rod assembly 26 attached to a structural member of the vehicle's frame and the other or free end of the shock absorber 10 is attached to a movable structure of the vehicle associated with one of the vehicle's wheels by means of a mounting bracket 102 having mounting apertures 104 and 106. The upper and lower working chamber 62 and 64 are filled with a hydraulic fluid while the reservoir 22 is only partially filled with hydraulic fluid. The remaining portion of the reservoir 22 is filled with a gas under pressure as is known in the art.

In operation, the piston 46 will assume a nominal position intermediate the extremeties of the inner cylinder 16. In the event the wheel associated with the shock absorber encounters a bump, a force will be applied to the free end of the shock absorber tending to displace the housing 12 and inner cylinder 16 upwardly towards the mounting stud 32 attached to vehicle's frame. This force will produce a pressure differential across the piston 46. When this pressure differential exceeds the force required to open spring loaded flapper valve 68, flapper valve 68 will open allowing the hydraulic fluid to flow through passageways 66 from the lower working chamber 64 to the upper working chamber 62 allowing the housing 12 and inner cylinder 16 to be displaced upward relative to piston 46. In the case of severe bump, the pressure in lower working chamber 64 may also exceed the pressure required to open one of the valves of the two way relief valve member 18. When this happens hydraulic fluid from the lower working chamber 64 will also flow through relief valve member 18 into the reservoir 22 between the housing 12 and inner cylinder 16. It being understood that upon rebound or in the event that the wheel falls into a hole, the operation of the shock absorber 10 is reversed from that described above with the passageways 58 and flapper valve 60 controlling the fluid flow from the upper working chamber 62 to the lower working chamber 64. The stiffness of the shock absorber 10 in both directions is primarily controlled by the effective diameters of the passageways 58 and 66 and the spring loading on the flapper valves 60 and 68, respectively.

The stiffness of shock absorbers 10 can be changed by activating the solenoid valve 40 to vent the upper working chamber 62 to the reservoir 22 through the telescoping cylinder 52. Referring to FIG. 2, when the solenoid coil 70 is not activated, spring 80 biases the armature 82 towards the poppet 86 and ball 88 blocks drain port 90. The poppet valve's bleed port 100 allows the fluid pressure of the upper working chamber 62 to be applied to both sides of poppet 86. Because the pressure in the working chamber 62 is always higher than that in the reservoir 22, as shall be explained hereinafter, a pressure differential will be exerted across poppet 86 holding it against the valve seat 94.

Activation of the solenoid coil 70 will displace the armature 82 and ball 88 away from poppet 82 opening drain port 90. Because the diameter of drain port 90 is larger than bleed port 100, the fluid pressure on the armature side of the poppet 86 will approach that of reservoir 22. The force produced by the fluid pressure in upper working chamber 62 is applied to the lower face of poppet 86 in the region of annular recess 96 and will unseat poppet 86 from valve seat 94. This opens up a direct fluid passageway from the upper working chamber 62 to the reservoir 22 through aperture 34, port 98 and the interior of telescoping cylinders 52.

When the wheel encounters a bump with the solenoid valve not actuated, a pressure differential is generated across the piston 46 as previously described resulting in a high pressure fluid flow through passageways 66 from the lower working chamber 64 to the upper working chamber 62. Because the cross section of the lower working chamber 64 is greater than the cross section of the upper working chamber 62, the high pressure fluid flow will result in the pressure in the upper chamber 62 increasing also. Since the fluid flow through the passageways 66 is proportional to the pressure differential across piston 46, the displacement of piston 46 is controlled by the pressure in the upper working chamber 62. Activation of the solenoid valve 40 vents the upper working chamber 62 to the reservoir increasing the pressure differential across piston 46. As a result, the high pressure fluid flow through passageway 66 increases which reduces the stiffness of the shock absorber in compression.

During the rebound or when the wheel falls into a hole, a force is generated tending to displace the housing and inner cylinder downwardly away from mounting stud 32. This force increases the fluid pressure in the upper working chamber 62 above the piston 46. When the solenoid valve 40 is actuated, the upper working chamber 62 is vented to the reservoir 22, therefore, the movement of the piston 46 is controlled primarily by the fluid flow through relief valve 18 from the reservoir 22 to the lower working chamber 64. The size of the fluid passageways of the relief valve 18 which control the rate of fluid flow from the reservoir 22 to the lower working chamber can be selected to decrease the stiffness of the shock absorber by the desired amount when the solenoid valve is open.

Figure 3:
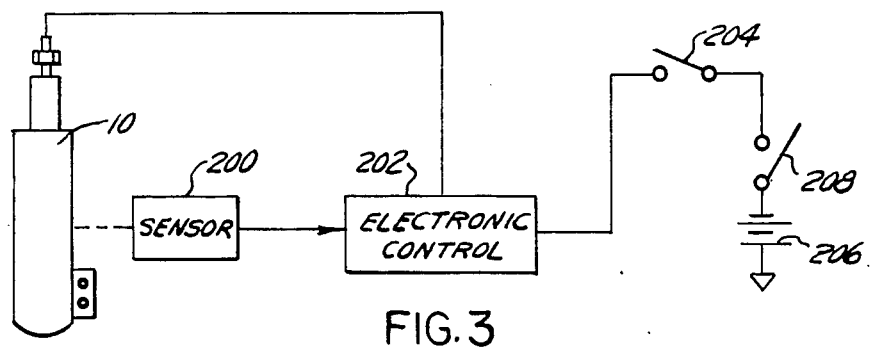
FIG. 3 is a block diagram variable rate shock-absorber's control system.

The stiffness of the single solenoid shock absorber may be electrically controlled by a switch provided on the vehicles control panel or by an electronic control system. Referring to FIG. 3, the control system comprises a sensor 200 detecting the acceleration or displacement of the shock absorber's housing 12 relative to the strut assembly 26 or to a structural member of the vehicles frame. An electronic control 202 will generate a signal to activate the shock absorber's solenoid valve 40 under predetermined conditions. Another input to the electronic control 202 is an operator actuated manual switch 204 provided on the vehicle's control panel or the vehicle's steering wheel. The switch 204 receives electrical power from the vehicle's source of electrical power, illustrated as battery 206, through the vehicle's ignition switch 208.

Figure 4:
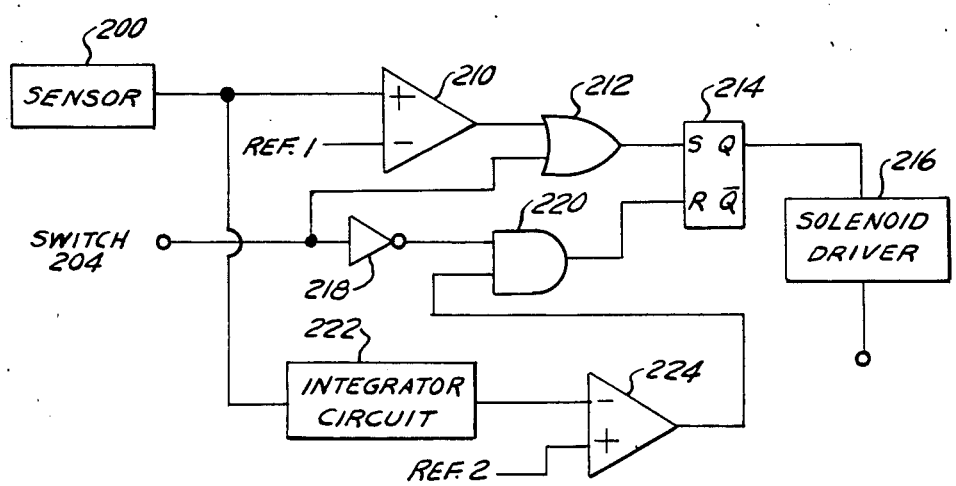
FIG. 4 is a circuit diagram of the electronic control.

FIG. 4 shows the structure of the electronic control 202 in greater detail. Referring to FIG. 4, the output of the sensor 200 is received at the input of a comparator 210 and an integrator 222. In this embodiment, the sensor 200 is an accelerometer producing a signal having a value proportional to the acceleration of the shock absorber's external housing.

The comparator 210 compares the output of the sensor 200 with a first reference signal (REF-1) indicative of a predetermined vertical acceleration. When the wheel's vertical acceleration is greater than the predetermined acceleration, the comparator 210 will generate a SET signal triggering RS Flip Flop 214 to the SET state through OR gate 212. In the "SET" state Flip Flop 214 will produce a positive signal at its Q output activating a solenoid driver circuit 216 to energize the solenoid valve 40 in the shock absorber 10. This reduces the stiffness of shock absorber 10 allowing it to absorb more of the wheel's vertical energy and reducing the energy transferred to the vehicle's frame.

The integrator 222 integrates the output of the sensor 200 to generate a velocity signal having a polarity indicative of the direction to the wheel's motion in a vertical plane and magnitude indicative of its velocity. As the wheel passes through the upper extremity of its travel in the vertical plane, the magnitude of the velocity signal will pass through zero then start to increase with a reversed polarity as the wheel starts to descend back to the road surface.

The output of the integrator circuit 222 is received at negative input terminal of a second comparator 224. A second reference signal REF-2 is received at the positive input of comparator 224. When the output of the integrator circuit 222 becomes less than the value of the reference signal REF-2, comparator 224 will generate a RESET signal received at the reset terminal of Flip Flop 214 through AND gate 220. AND gate 220 is enabled by switch 204 being in an open state as shall be explained hereinafter. The RESET signal will reset Flip Flop 214 deactivating the solenoid driver 216 and de-energizing the solenoid valve 40. As previously described de-energizing solenoid valve 40 will increase the stiffness of the shock absorber 10. Flip Flop 214 will remain in the RESET state with solenoid valve 40 de-energized until it is again placed in the SET state by the wheel experiencing a vertical acceleration greater than the valve predetermined by the first reference signal REF-1.

The value of the second reference signal REF-2 is determined by the dynamics of the vehicle and its suspension system. For heavier vehicles, the reference signal REF-2 may have a positive value indicative of a predetermined vertical velocity such that comparator 224 generates the RESET signal and the solenoid valve 40 is de-energized before the wheel reaches the apex of its vertical ascent. For lighter vehicles the value of the reference signal REF-2 may be zero such that the solenoid valve 40 is de-energized at the apex of the wheel's vertical ascent or the reference signal may assume a negative value such that the solenoid valve 40 is de-energized during the wheel's descent.

The signal from the manual switch 204 is received at the other input of OR gate 212 and the input of an inverter 218. The closing of manual switch 204 will place the Flip Flop 214 in the SET state actuating the solenoid driver 216. Inverter 218, in response to the manual switch 204 being closed, will produce a ground or negative output disabling AMD gate 220 preventing the RESET signal generated by comparator 224 from resetting Flip Flop 214. Inverter 218 will produce a positive signal enabling AND gate 220 when the manual switch 204 is open.

Those skilled in the art will recognize that the integrator circuit 222 and comparator 224 may be replaced by a single shot multi-vibrator or timer (not shown) triggered by the Q output of Flip Flop 214. The multi-vibrator or timer will generate a RESET signal after a predetermined delay period which is applied to the reset terminal of Flip Flop 214. This RESET signal will reset Flip Flop 214 deactivating solenoid driver 216 and de-energizing solenoid valve 40. The delay period is selected so that the stiffness of the shock absorber is changed when the wheel is near or at the apex of its vertical ascent.

It is understood that the invention is not to be limited to the specific embodiment shown in drawings and discussed in the specification. It is recognized that one skilled in the art may make changes to the variable rate shock absorber without departing from the spirit of the invention as disclosed herein and set forth in the appended claims.

I claim:

1. A variable rate shock-absorber of the type having an enclosed working cylinder, an external housing circumscribing the working cylinder and one end thereof to form a fluid reservoir, a piston disposed in the working cylinder dividing the interior of the working cylinder into an upper and lower working chamber, means provided at the end of the working cylinder connecting the lower working chamber with the reservoir, and a hollow piston rod slidably received in the other end of the working cylinder, said piston rod having one end connected to the piston and the opposite end extending external to the working cylinder, the variable rate shock-absorber characterized by:

a telescoping cylinder disposed in said working cylinder having one end in fluid communication with the reservoir and the other end slidably received into the interior of said hollow piston rod; and solenoid valve means disposed in the hollow piston rod and connected to the other end of said telescoping cylinder, said solenoid valve means having an inlet port in fluid communication with said upper working chamber and an outlet port in fluid communication with the reservoir through the interior of said telescoping cylinder, said solenoid valve means responsive to an electrical input signal to switch between an open state enabling a fluid flow between said inlet and outlet ports and a closed state inhibiting a fluid flow between said inlet and outlet ports.

2. The variable rate shock absorber of claim 1 wherein said means for connecting the lower working chamber with the reservoir is a bi-directional relief valve member disposed at said one end of said working chamber, said relief valve member having an axial aperture having said one end of said telescoping cylinder received therethrough.

3. The variable rate shock absorber of claim 1 wherein said hollow piston rod comprises:
   a cylindrical strut having an aperture provided through a wall thereof intermediate its opposite ends;
   a piston stud fixedly received in one end of said cylindrical strut, said piston stud having means for attaching the piston thereto and an axial bore slidably receiving said telescoping cylinder therethrough; and
   a mounting stud fixedly received in the other end of said cylindrical strut said mounting stud having means for attaching said piston rod to the vehicle's frame.

4. The variable rate shock absorber of claim 3 wherein said solenoid valve is a solenoid actuated poppet valve having a poppet member engaging a valve seat member, said valve seat member connected to the other end of said telescoping cylinder and having said outlet port disposed concentric with and in fluid communication with the interior of said telescoping cylinder, said valve seat member further having a valve seat circumscribing said outlet port and said inlet port radially offset from said outlet port and in fluid communication with the interior of said cylindrical strut.

5. The variable rate shock absorber of claim 4 wherein said telescoping cylinder comprises:
   an internal cylinder having said one end which is attached to said relief valve member and having an opposite end slidably received through said axial bore of said piston stud and extending into the interior of said cylindrical strut; and
   an external cylinder cicumscribing the portion of said internal cylinder, extending into the interior of said cylindrical strut, said external cylinder having said other end which is connected to said valve seat and an opposite end connected to said piston stud.

6. The variable rate shock absorber of claim 3 wherein said solenoid valve comprises:
   a valve seat member fixedly disposed at the end of said hollow piston rod opposite said piston and connected to the other end of said telescoping cylinder; said valve seat member having said outlet provided concentric with said telescoping cylinder and in fluid communication with the interior thereof, a valve seat circumscribing said outlet port, and an inlet port radially offset from said outlet port,
   a poppet member disposed adjacent to said valve seat member and engageable with said valve seat, said poppet member having a bleed port passing therethrough and in fluid communication with said inlet port and an axial spill port in fluid communication with the interior of said telescoping cylinder;
   a resiliently biased armature disposed on the side of said poppet member opposite said valve seat member, said armature engaging said poppet member closing said spill port and biasing said poppet member against said valve seat;
   a stator member fixedly disposed in said hollow piston rod concentric with and a predetermined distance from said armature; and
   a solenoid coil circumscribing said stator for generating a magnetic field in response to an electrical signal operative to produce a force sufficient to displace said armature away from said poppet member and opening said spill port.

7. A variable rate shock absorber comprising:
   a cylindrical housing having a closed end;
   an enclosed working cylinder concentrically disposed in said housing defining an enclosed fluid reservoir between itself and said housing;
   a piston member disposed in said working cylinder dividing the interior thereof into a lower working chamber adjacent to the closed end of the housing and an upper working chamber;
   a hollow piston rod having one end attached to the piston and the other end slidably passing through the end of said working cylinder opposite the end enclosed by said housing and extending external thereto;
   a bi-directional relief valve member enclosing the other end of said working cylinder, said relief valve member providing by-directional fluid flow between said lower working chamber and said reservoir;
   a telescoping cylinder axially disposed in said working cylinder, said telescoping cylinder having one end connected to said relief valve member and in fluid communication with said reservoir and an opposite end slidably disposed in the interior of said hollow piston rod; and
   a solenoid valve disposed in said hollow piston rod and connected to the other end of telescoping cylinder, said solenoid valve having an inlet port in fluid communication with said upper working chamber and an outlet port in fluid communication with the interior of said telescoping cylinder.

8. The shock absorber of claim 7 wherein said bi-directional relief valve has an axial aperture passing therethrough and wherein said one end of said telescoping cylinder passes through said axial aperture.

9. The shock absorber of claim 7 wherein said hollow piston rod comprises:
   a cylindrical strut member;
   a piston stud fixedly attached to one end of said cylindrical strut member said piston stud having means for attaching said piston thereto and an axial bore slidably receiving said telescoping cylinder therethrough; and
   a mounting stud fixedly attached to the other end of said cylindrical strut member.

10. The shock absorber of claim 9 wherein said solenoid valve is a solenoid actuated poppet valve having a poppet member and a seat member engaged by said poppet member, said seat member disposed in said cylindrical strut member and connected to said other end of said telescoping cylinder, said seat member having said outlet port axially disposed therethrough and in fluid communication with the interior of said telescoping cylinder, a valve seat circumscribing said outlet port, and a radially offset inlet port in fluid communication with the interior of said cylindrical strut member.

11. The shock absorber of claim 10 wherein said telescoping cylinder comprises:
   an internal cylinder having one end connected to said relief valve member and having an opposite end passing through said piston stud's axial bore and extending into the interior of said cylindrical strut member; and an external cylinder circumscribing the portion of said internal cylinder extending into the interior of said cylindrical strut member, said external cylinder having one end attached to said piston stud and the other end connected to said outlet port of said seat member.

12. The shock absorber of claim 9 wherein said solenoid valve comprises:
a valve seat member fixedly disposed at the end of said hollow piston rod opposite said piston and connected to the other end of said telescoping cylinder; said valve seat member having said outlet provided concentric with said telescoping cylinder and in fluid communication with the interior thereof, a valve seat circumscribing said outlet port, and an inlet port radially offset from said outlet port,
a poppet member disposed adjacent to said valve seat member and engageable with said valve seat, said poppet member having a bleed port passing therethrough and in fluid communication with said inlet port and an axial spill port in fluid communication with the interior of said telescoping cylinder;
a resiliently biased armature disposed on the side of said poppet member opposite said valve seat member, said armature engaging said poppet membe closing said spill port and baising said poppet member against said valve seat;
a stator member fixedly disposed in said hollow piston rod concentric with and a predetermined distance from said armature; and
a solenoid coil circumscribing said stator for generating a magnetic field in response to an electrical signal operative to produce a force sufficient to displace said armature away from said poppet member and opening said spill port.

13. A variable rate shock absorber comprising:
a working cylinder;
an end member having an axial piston rod aperture enclosing one end of said working cylinder;
a bi-directional relief valve member enclosing the other end of said working cylinder;
a reservoir circumscribing said working cylinder and in fluid communication with said bi-directional relief valve member;
a piston member dividing the interior of said working cylinder into an upper working chamber adjacent to said end member and a lower working chamber adjacent to said bi-directional relief valve member;
a hollow piston rod connected to said piston and extending external to said working cylinder through said piston rod aperture;
solenoid valve means disposed in said hollow piston rod having an inlet port in fluid communication with said upper working chamber and an outlet port; and
a telescoping cylinder axially disposed in said working cylinder, said telescoping cylinder having one end attached to said bi-directional relief valve member and in fluid communication with said reservoir and an opposite end slidably passing through said piston and connected to said outlet port of said solenoid valve.

14. A variable rate shock absorber comprising:
a piston reciprocatively disposed within and dividing a working cylinder into an upper working chamber and a lower working chamber, said piston including first flow means for permitting fluid to flow from said upper working chamber to said lower working chamber and second flow means for permitting fluid to flow from said second working chamber to said first working chamber, said first and second flow means operative in correspondence with the direction of motion of said postion;
a hollow piston rod, movably received within said working cylinder, for moving said piston and including an aperture therein for communicating fluid from said working cylinder to the interior thereof;
solenoid valve means disposed within and movable with said piston rod for controlling the rate of motion of said piston including an inlet port in communication with said aperture and an outlet port communicated to a lower pressure reservoir, whereby when said solenoid valve means is activated, fluid flows from said inlet port to said outlet port regardless of the motion of said piston.

15. A variable rate shock absorber comprising
a working cylinder filled with fluid,
a piston attached to a hollow piston rod and reciprocatively movable within said working cylinder for dividing said working cylinder into an upper chamber and a lower chamber,
means for controlling the rate at which said piston moves within said working chamber comprising:
direction sensitive first flow means for permitting fluid to flow from said upper chamber to said lower chamber when the relative motion between said piston and said working chamber is such that said piston moves in first direction,
direction sensitive second flow means for permitting fluid to flow from said lower chamber to said upper chamber when the relative motion between said piston and said working chamber is such that said piston moves in a second direction, opposite said first direction;
an aperture extending through said piston rod for communicating said upper chamber to the interior of said piston rod;
solenoid valve means responsive to a control signal, disposed within said piston rod for controlling the rate at which fluid flows from said upper chamber to a lower pressure reservoir, including an inlet for receiving fluid from said aperture and an outlet communicated to said reservoir wherein when said solenoid valve means is activated to permit fluid flow therethrough said upper working chamber is vented to said reservoir, said fluid flow through said solenoid always being in the same direction regardless of the direction of the piston.

* * * * *